United States Patent [19]

Löhr et al.

[11] Patent Number: 4,781,160

[45] Date of Patent: Nov. 1, 1988

[54] METHOD FOR OPERATING AN EXHAUST-GAS-TURBOCHARGED, LOW-COMPRESSION MULTI-CYLINDER DIESEL-CYCLE INTERNAL COMBUSTION ENGINE

[75] Inventors: Joachim Löhr; Volker Rasch; Walter Gotre, all of Nuremberg, Fed. Rep. of Germany

[73] Assignee: Man Nutzfahrzeuge GmbH, Munich, Fed. Rep. of Germany

[21] Appl. No.: 103,494

[22] Filed: Oct. 1, 1987

[30] Foreign Application Priority Data

Oct. 1, 1986 [DE] Fed. Rep. of Germany ....... 3633405

[51] Int. Cl.$^4$ .............................................. F02D 17/00
[52] U.S. Cl. ................. 123/198 F; 123/325; 123/481
[58] Field of Search .............. 123/198 F, 481, 325

[56] References Cited

U.S. PATENT DOCUMENTS

| | | | |
|---|---|---|---|
| 3,683,869 | 8/1972 | Kamazuka et al. | 123/325 |
| 3,795,237 | 3/1974 | Denton | 123/325 |
| 4,466,404 | 8/1984 | Ueno et al. | 123/198 F |
| 4,467,758 | 8/1984 | Ueno et al. | 123/198 F |
| 4,491,115 | 1/1985 | Otobe et al. | 123/325 |
| 4,535,744 | 8/1985 | Matsumura | 123/325 |
| 4,537,169 | 8/1985 | Tsuge et al. | 123/325 |
| 4,572,148 | 2/1986 | Dentschmann et al. | 123/198 F |
| 4,598,679 | 7/1986 | Ohkumo et al. | 123/325 |

*Primary Examiner*—Raymond A. Nelli
*Attorney, Agent, or Firm*—Becker & Becker

[57] ABSTRACT

A method of operating and exhaust-gas-turbocharged, low-compression multi-cylinder Diesel-cycle internal combustion engine that has a first cylinder group which operates over the full load range, and a second cylinder group which is cut out during starting and in the idling and part load ranges but is cut in in the remaining load range, each cylinder group having associated with it a turbocharger with associated charge air pipe, the charge air pipes being interconnected by a pressure equalizing system. To improve the starting and part load behavior, and/or permit good acceleration behavior from the lower idle to rated output (to reduce emission of noxious substances in the exhaust gas), pressure equalization between the two charge air pipes is interrupted during the cylinder cutout mode - during starting as well as in the lower load and speed ranges - and is restored in the upper load range by a load-responsive device, and at the same time the intake air for the firing cylinders is preheated during the cylinder cutout mode by means known per se.

5 Claims, 1 Drawing Sheet

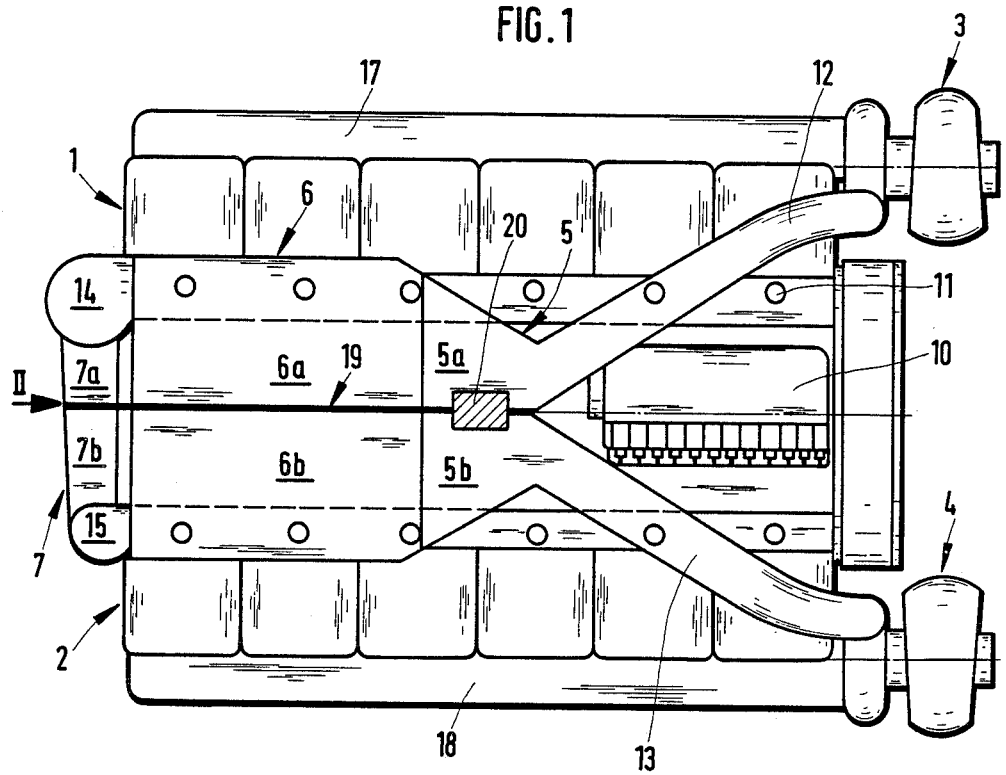
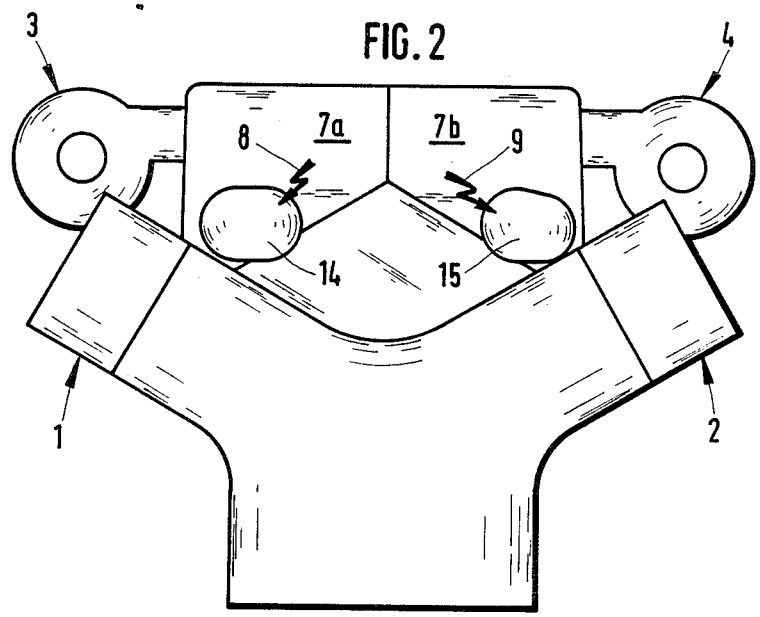

METHOD FOR OPERATING AN EXHAUST-GAS-TURBOCHARGED, LOW-COMPRESSION MULTI-CYLINDER DIESEL-CYCLE INTERNAL COMBUSTION ENGINE

BACKGROUND OF THE INVENTION

The present invention relates to a method of operating an exhaust-gas-turbocharged, low-compression multi-cylinder Diesel-cycle internal combustion engine that has a first cylinder group which operates over the full load range, and a second cylinder group which is cut out during starting or at no load (idle) and in the part load range, but is cut in in the remaining load range. Cutting out and cutting in of the second cylinder group is effected by cutting off or cutting in the fuel supply, each cylinder group having associated with it an exhaust-gas-operated turbocharger with an associated charge air pipe, the charge air pipes communicating with each other through a so-called pressure equalizing system.

A disadvantage of supercharging consists in the fact that the ignition pressure rises, and hence the mechanical and thermal stresses in the piston/connection rod/-crankshaft system increase. To prevent this effect, supercharging must be accompanied by a corresponding decrease in the compression ratio of the engine. The resultant decrease in the final compression temperature adversely affects the ignition conditions in the cylinder and influences the starting and no-load behavior, including operation in the low-load range. Excessive formation of white smoke is the consequence.

White smoke contains unburned hydrocarbons (i.e. fuel droplets) which are emitted with the exhaust gases from the cylinders. It is the result of incomplete combustion in the cylinders and occurs when the compression temperature in the cylinders of the engine is not sufficient to burn all of the injected fuel, such as is the case, for instance, when the engine is being started.

White smoke thus differs in its substance from black smoke, which contains carbon particles and which occurs under conditions where the compression temperature is sufficient to ensure combustion, but the supply of oxygen is not sufficient to oxidize all of the carbon in the fuel.

To improve this critical starting and part-load behavior, it is known to cut out a certain number of cylinders (i.e. there will be no injection into these cylinders). This method is generally known. It is applied to Otto-cycle engines to decrease the fuel consumption in the low-load range. The importance of this method for the supercharged Diesel engine is in the fact that cutting out of cylinders will place an additional load on the remaining firing cylinders. This means higher volumetric efficiency, increase in the amount of fuel injected, improved atomization or mixture formation, and a higher temperature level in the working cylinders. The result is a substantial reduction in hydrocarbon emission.

The (straight) cylinder cutout has been applied to Diesel engines—as far as is known—only in no-load operation and in the transitional phase to low mean effective pressures. To this end, cutout control systems have been developed both for engines with unit and individual injection pumps (see, for instance, DE-PS 28 21 161, key word: Split control rod).

Where further reduction in the compression ratios is desired, this problem is solved by combining cylinder cutout with post-charging of firing cylinders by pre-compressed air from the non-firing cylinders (see, for instance, German Pat. Nos. 33 22 168 and 33 23 337).

This method calls for a considerable control complexity, including valves, air reservoirs, as well as cutting-out and cutting-in devices for the turbochargers concerned.

The present invention therefore relies only on straight cylinder cutout, which itself is known. However, in the case of the type of internal combustion engine preferred to above with two separate turbochargers and two charge air pipes, which are interconnected by a pressure equalizing circuit, this has a serious disadvantage in poor acceleration and increased black smoke in the cutout mode because the charge air pressure built up by the relevant turbochargers via the firing cylinders expands instantly via the pressure equalization into the non-firing cylinder bank. As a result, the charge air pressure in the firing cylinders decreases and, consequently, is not available during combustion. As a result, a smoke stop provided on the injection pump (LDA=-charge pressure-dependent full-load stop, which limits the control rod path on the injection pump and, consequently, the injection rate at low charge pressures) releases the amount of fuel needed for rapid acceleration only with such a time lag as is required for the necessary charge pressure to build up again or, failing an LDA fuel stop, would lead to substantial amounts of black smoke.

The object of the present invention is therefore to offset deficient supercharging by the turbocharger in an internal combustion engine of the aforementioned general type during starting and at part load in a simple manner, and to achieve a sufficiently high temperature in the firing engine cylinders for ignition to occur despite the low compression ratio during starting, and/or better combustion of the fuel with reduced emission of noxious matter in the exhaust gas in the partial load mode.

BRIEF DESCRIPTION OF THE DRAWING

This object, and other objects and advantages of the present invention, will appear more clearly from the following specification in conjunction with the accompanying drawing, in which:

FIG. 1 is a schematic top view representation of a V-form Diesel engine with 12 cylinders, two turbochargers, and an intercooler (aftercooler); and FIG. 2 is an elevation viewed in the direction of the arrow II in FIG. 1.

SUMMARY OF THE INVENTION

The method of the present invention is characterized primarily in that in the cylinder cutout mode—during starting as well as in the lower load and speed ranges—pressure equalization between the two charge air pipes is interrupted, and in the upper load range is restored by a load-controlled device, and in that at the same time, in the cylinder cutout mode, the intake air for the firing cylinders is preheated by means known per se, such as Diesel-fuel-operated glow plugs or electrically operated glow plugs.

Interruption of pressure equalization in the cylinder cutout mode prevents charge air from being lost into the non-firing cylinders. At a suitable load level, the pressure equalizing circuit is opened again (in conjunction with the cutting in of the other cylinders) in order to supply both cylinder banks with the same charge pressure, because otherwise widely diverging cylinder peak pressures would be liable to occur due to the different charge pressures caused by manufacturing tolerances in the valve train, in gas and air passages, with regard to injection rates and injection timing as well as in turbine rotors and compressor impellers, entailing undesirably high fluctuating torques that act on the piston/connecting rod/crankshaft assembly and would lead to the engine shaking on its mountings.

As a parallel measure, it is at the same time proposed to preheat the induction or intake air for the firing cylinders. This could be done under electronic cycling control using temperature sensors (measuring the temperature of the intake air) which are cut in and cut out automatically. Alternatively, control action as a function of the load would be conceivable.

Where intercooling or aftercooling is provided, it is useful as a further development of the invention in solving the problem, to interrupt the flow of coolant through the intercooler in the cylinder cutout mode so that the charge air passing through the intercooler undergoes no cooling.

A simple injection pump with only one control rod can be used for injecting the fuel. Cutting in and cutting off the fuel supply is effected in this type of pump as a function of the load by special grooves in the elements of the injection pump. As far as is known, this type of injection pump has so far been used only for interrupting the fuel supply at no load or in the low-load mode. As a further feature of the invention, such as injection pump is now proposed to be used also to interrupt the fuel supply during cold starting or under conditions of free acceleration (in the latter case in order to interrupt temporary injection of the fuel into the cut out cylinders).

DESCRIPTION OF PREFERRED EMBODIMENTS

Referring now to the drawing in detail, FIGS. 1 and 2 show a supercharged Diesel-cycle internal combustion engine that has two cylinders banks 1 and 2, each comprising six cylinders. Supercharging of cylinder bank 1 is effected by the turbocharger 3, and supercharging of cylinder bank 2 is effected by the turbocharger 4. The charge air pipes 12 and 13 coming from the turbochargers are united in a diffuser-type inlet casing 5 that preceeds an intercooler (aftercooler) 6. Uniting the pipes in the casing 5 would normally provide pressure equalization. According to the invention, the casing 5, the intercooler 6, as well as the intercooler outlet 7 are provided with a continuous partition 19 that has a control valve 20 in the region of the casing 5. The partition 19 practically creates a separate charge air circuit for each cylinder bank 1 and 2, with separate inlets 5a and 5b, separate heat exchanger units 6a and 6b, and separate outlets 7a and 7b, whereby controlled pressure equalization is now provided by means of the control valve 20 (for instance, a globe valve or rotary valve). The control valve 20 is controlled as a function of the load, being closed in the cutout cylinder mode (at least half the number of cylinders is cutout, i.e. one cylinder bank of the V-engine), and being open when all cylinders are operated. This results in good acceleration behavior from lower idle to rated output. On the other hand, in the upper load range the same charging pressure exists at all cylinder inlets, thus ensuring sufficient ignition pressure and equal proportions of excess air.

As can be further seen from the figures, the charge air flows from the outlets 7a and 7b, via the respective inlets 14 and 15, to the cylinder head inlet ports, which are not shown in detail. A respective heating device 8 and 9 is provided downstream at the inlet of the pipes 14 and 15. Depending on which of the two cylinders banks is to be fired initially, either the heating device 8 or the heating device 9 is operated. With regard to heating devices, Diesel-fuel-operated glow plugs or electrically heated glow plugs may be used which are cut in and cut out automatically via a control unit under temperature or load-responsive control. In this manner, the intake air is preheated in a simple manner (in order to increase the final compression temperature).

It should be mentioned that the exhaust gas turbines of the turbochargers 3 and 4 are supplied in the usual manner via the exhaust gas pipes 17 and 18 respectively, and that the fuel is delivered via the schematically-indicated injection pump 10, through injection pipes that are not shown, to the individual injectors 11 in the respective cylinder heads and into the cylinders which are in the firing mode (as described above).

The present invention is, of course, in no way restricted to the specific disclosure of the specification and drawing, but also encompasses any modifications within the scope of the appended claims.

What we claim is:

1. In a method of operating an exhaust-gas-turbocharged, low-compression, multi-cylinder Diesel-cycle internal combustion engine that has a first cylinder group which operates over the full load range, and a second cylinder group which is cut out during starting and in the idling and part load ranges, but is cut in in the remaining load range, with cutting out and cutting in of the second cylinder group being effected by respectively cutting off or cutting in the fuel supply, each cylinder group having associated with it an exhaust-gas-operated turbocharger with an associated charge air pipe, the latter communicating with one another via a so-called pressure equalization system, the improvement comprising the steps of:

in the cylinder cutout mode, i.e. during starting as well as in the lower load and speed ranges, interrupting pressure equalization between the two charge air pipes;

in the upper load range, restoring pressure equalization via a load-controlled device; and during cylinder cutout, preheating the intake air for the firing cylinders.

2. A method according to claim 1, in which said preheating step comprises preheating said intake air with Diesel-fuel-operated glow plugs.

3. A method according to claim 1, in which said preheating step comprises preheating said intake air with electrically heated glow plugs.

4. A method according to claim 1, for an internal combustion engine having an intercooler, including the step of interrupting the flow of coolant through said intercooler in the operating mode of cylinder cutout and air preheating.

5. A method according to claim 4, which includes the steps of providing a simple injection pump with only one control rod, and providing special grooves in the elements of the injection pump to prevent the injection of fuel into the cutout cylinders during cold starting and/or in the unloaded condition, especially under conditions of so-called free acceleration.

* * * * *